Oct. 22, 1935.　　　　E. F. PAWSAT　　　　2,018,531
STAND FOR BICYCLES
Filed Oct. 19, 1934
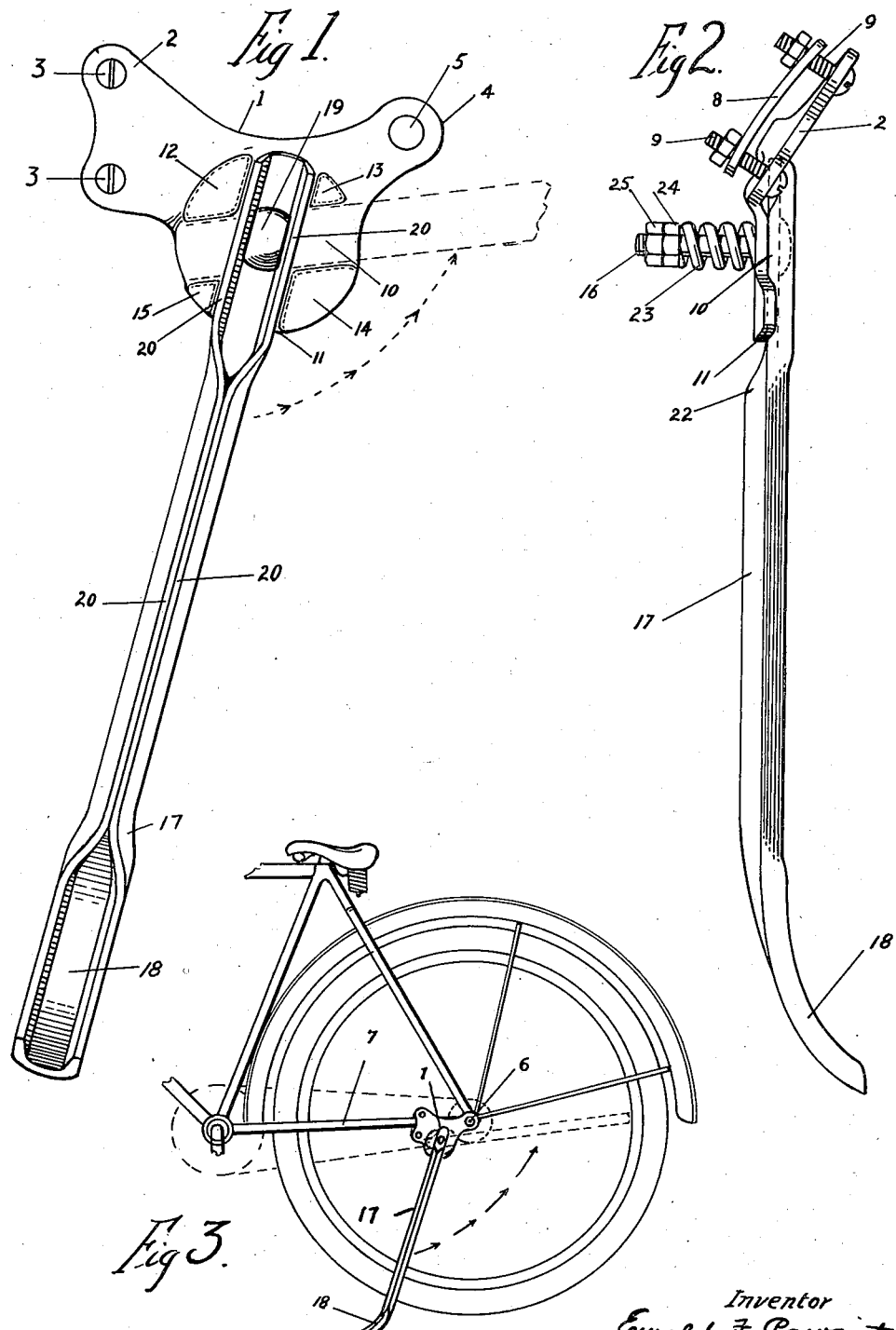
Inventor
Ewald F. Pawsat,
By Arthur H. Ewald,
Attorney Patented Oct. 22, 1935

2,018,531

UNITED STATES PATENT OFFICE 2,018,531

STAND FOR BICYCLES

Ewald F. Pawsat, Maysville, Ky., assignor to Wald Manufacturing Company, Incorporated, a corporation of Kentucky Application October 19, 1934, Serial No. 749,093

1 Claim. (Cl. 208—79)

The present invention relates to stands for bicycles of the type permanently secured to the bicycle and adapted to be placed in either supporting or nonsupporting position.

The principal object of the present invention is to provide certain improvements in the bicycle stand described and claimed in my copending application Serial No. 743,321, filed September 10, 1934, said improvements being designed to increase the efficiency and ornamental appearance of the device, as well as to provide increased economy in production.

Further objects of my invention will appear from the following detailed description thereof.

In the drawing:

Figure 1 is a side elevation of a stand constructed in accordance with the present invention.

Figure 2 is a front elevation of said stand.

Figure 3 is an elevation of a portion of a bicycle with the stand attached.

The numeral 1 indicates a plate having a front extension 2 provided with two perforations 3—3 in substantially vertical alignment. Said plate also has a rear extension 4 provided with a perforation 5. Plate 1 is arranged to be secured to a bicycle by placing the perforation 5 over the rear axle 6 with the perforations 3—3 above and below the lower rear frame member 7. A clamping plate 8 is adapted to be secured to the extension 2 so as to embrace the frame member 7 by means of bolts 9. The main body of the plate 1 slightly below the extensions 2 and 4 is provided with shallow channels 10 and 11 which intersect at an oblique angle as clearly shown in Figure 1. Said channels are formed by providing the plate with four bosses 12, 13, 14 and 15, which may be pressed into the plate at the time of its formation. At the central point of intersection of the channels 10 and 11, the plate is provided with a perforation for a bolt 16.

The numeral 17 indicates the standard or supporting member of the stand, said standard being formed from channel bar metal. The lower end of the standard is bent outwardly as shown in Figures 2 and 3 to form a foot 18. Near the upper end of the standard, it is provided with a perforation through which the bolt 16 is adapted to be inserted so as to secure the standard to the plate 1, the head 19 of the bolt resting between the channel flanges 20. The upper end of the standard is prolonged so as to be coextensive with the respective channels 10 and 11. The flanges 20 of standard 17 intermediate the lower edge of plate 1, when the parts are in assembly, and the foot 18, are folded over so as to meet as shown in Figure 1, and the rear or base portion of the channel is bent backwardly so as to form a shoulder 22, which is substantially in alignment with the back surface of plate 1, as shown in Figure 2. A spring 23 surrounds the bolt 16 in back of plate 1 when the plate and standard are in assembly, the spring being held in compression between the plate 1 and a nut 24. A lock nut 25 prevents loosening of the nut 24.

The nature and use of my new bicycle stand will be apparent from the foregoing description. As will be seen the spring 23 is adapted to hold the upper portion of the standard compressed against the plate 1. Plate 1 being secured to the bicycle as above described and illustrated in Figure 3, the standard 17 is adapted to be placed in supporting position as shown in full lines in Figure 3, in which position the upper end of the standard is held in compression in the channel 11, or into nonsupporting position, shown in broken lines in Figure 3, when the upper end of the standard rests under compression in the channel 10. During transition from supporting to nonsupporting position, or vice versa, the upper end of the standard rides over the bosses 12 and 14 against the compression of spring 23.

It will be apparent from the foregoing description that certain modifications may be made in the details of construction as above described, which modifications are deemed within the scope of the present invention as defined by the appended claim.

Having thus fully described my invention, what I claim as new and desire to secure by Letters Patent is:

A stand for bicycles comprising a plate, a front extension on the upper portion of said plate, a rear extension on the upper portion of said plate, said front and rear extensions being disposed at an oblique angle with reference to the plane of the plate proper, said front extension being provided with a pair of perforations in substantially vertical alignment, and said rear extension being provided with a single perforation adapted to fit over the axle of a bicycle, a clamping plate adapted to cooperate with said front extension, said clamping plate being provided with a pair of perforations arranged to register with the perforations on the front extension, bolts whereby said front extension and clamping plate may be secured together on opposite sides of a portion of the frame of said bicycle, shallow intersecting channels in said plate, said plate being provided with a perforation at the central point of intersection of said channels, a standard, a bolt arranged to fit rotatably through the perforation at the intersection of the channels in said plate to secure said standard thereto, and a spring around said bolt adapted to hold said standard in compression against said plate.

EWALD F. PAWSAT.